United States Patent [19]

Seufert

[11] Patent Number: 4,526,676
[45] Date of Patent: Jul. 2, 1985

[54] INTEGRATED H-OIL PROCESS INCLUDING RECOVERY AND TREATMENT OF VENT AND PURGE GAS STREAMS AND SOOT-NAPHTHA STREAM

[75] Inventor: Frederick B. Seufert, Bedford Hills, N.Y.

[73] Assignee: Texaco Development Corporation, White Plains, N.Y.

[21] Appl. No.: 469,182

[22] Filed: Feb. 24, 1983

[51] Int. Cl.³ .................. C10G 69/02; C01B 3/36
[52] U.S. Cl. ........................... 208/58; 208/89; 208/108; 48/197 R
[58] Field of Search ............ 208/108, 58, 89; 48/197 R

[56] References Cited

U.S. PATENT DOCUMENTS

| | | | |
|---|---|---|---|
| 3,905,892 | 9/1975 | Gregoli et al. | 208/95 |
| 3,980,592 | 9/1976 | Marion | 48/196 R |
| 4,052,176 | 10/1977 | Child et al. | 55/32 |
| 4,074,981 | 2/1978 | Slater | 48/197 R |
| 4,099,932 | 7/1978 | Child | 48/197 R |
| 4,141,696 | 2/1979 | Marion et al. | 48/197 R |
| 4,402,709 | 9/1983 | Stellaccio | 48/197 R |
| 4,411,671 | 10/1983 | Marion et al. | 48/197 R |

Primary Examiner—D. E. Gantz
Assistant Examiner—O. Chaudhuri
Attorney, Agent, or Firm—Robert A. Kulason; Carl G. Seutter

[57] ABSTRACT

Carbon content of vent and purge gases from hydrotreating is included as charge to synthesis gas generation with resulting efficiencies including decreased need for steam moderation and increased conversion of charge to desired product.

13 Claims, 2 Drawing Figures

INTEGRATED H-OIL PROCESS INCLUDING RECOVERY AND TREATMENT OF VENT AND PURGE GAS STREAMS AND SOOT-NAPHTHA STREAM

FIELD OF THE INVENTION

This invention relates to hydrocarbon conversion. More particularly, it relates to a method for utilizing various streams produced during hydrotreating of heavy hydrocarbon fractions to obtain greater efficiencies in the overall processing scheme.

BACKGROUND OF THE INVENTION

As is well known to those skilled in the art, it is desirable to hydrotreat heavy hydrocarbon oils to convert them to lighter hydrocarbons which may be used as feed to conventional refining processes. Efficient operation requires that the refiner make maximum utilization of the valuable components of the effluent streams from this and other processes.

It is an object of this invention to provide a novel process and apparatus for effecting hydrotreating of heavy oils. It is another object of this invention to integrate a hydrotreating operation and a synthesis gas production operation. Other objects will be apparent to those skilled in the art.

STATEMENT OF THE INVENTION

In accordance with certain of its aspects, the novel method of this invention may comprise hydrotreating a heavy hydrocarbon charge having a 95% boiling point above about 975° F. in the presence of hydrotreating catalyst at 700° F.–850° F. and 2,000–3,500 psig hydrogen partial pressure thereby forming a product stream containing (i) hydrotreated hydrocarbon characterized by a boiling point lower than that of said heavy hydrocarbon charge, (ii) hydrogen, (iii) ammonia and hydrogen sulfide, and (iv) lower hydrocarbons;

separating from said product stream a separated gas stream containing hydrogen, ammonia, hydrogen sulfide and lower hydrocarbons;

passing at least a portion of said separated gas stream to a synthesis gas generation reaction zone wherein a hydrocarbon charge stream is gasified in the presence of a free-oxygen-containing gas and in the presence of temperature moderator thereby forming increased quantities of product synthesis gas; and recovering said product synthesis gas.

DESCRIPTION OF THE INVENTION

The heavy hydrocarbon charge compositions which may be employed in practice of the process of this invention may be characterized by a 95% boiling point above about 975° F., commonly 975° F.–1050+° F. These charge compositions may commonly be characterized by an API gravity of below 15, preferably −10 to 15, say about 2.8 and by an ibp of 975° F.–1025° F., say 975° F. and an ep of 975° F.–1050+° F., say 1025° +F. The sulfur content may be 2 w %–8 w %, say 5.7 w % and the nitrogen content may be 0.01 w %–1 w %, say 0.4 w %. Heavy metals may commonly be present, e.g. nickel in amount of 100–1000, say 122 wppm and vanadium in amount of 100–1000, say 400–600, say 439 wppm.

These charge compositions may commonly be identified as vacuum bottoms, short resid, asphalt, tar, pitch, etc.

Illustrative charge compositions may include:

| | | |
|---|---|---|
| (i) | Vacuum bottoms | 2.8 API |
| | 95% above | 975° F. |
| | Sulfur | 5.7 w % |
| | Nitrogen | 0.4 w % |
| | Carbon | 83.96 w % |
| | Hydrogen | 9.88 w % |
| | Ash (total) | 0.06 w % |
| | Conradsen Carbon (CCR) | 24.3 w % |
| (ii) | Tar(1040° F.+) | −9 API |
| | Sulfur | 7.8 w % |
| | Nitrogen | 0.86 w % |
| | Carbon | 84.1 w % |
| | Hydrogen | 7.2 w % |
| | Ash | 0.01 w % |
| (iii) | Pitch (1040° F.+) | −4.03 API |
| | Sulfur | 4.1 w % |
| | Nitrogen | 0.7 w % |
| | Carbon | 87.9 w % |
| | Hydrogen | 7.1 w % |
| | Ash | 0.2 w % |

In practice of the process of this invention according to a preferred aspect, 251,876 parts of charge hydrocarbon oil is preferably blended with 0–150,000 parts, say 125,000 parts of a recycle stream of soot-heavy oil containing 0–1 w %, say 0.35 w % of soot, which is substantially pure (greater than 95 w %) carbon of particle size in the 1–10 micron range. The recycle stream contains 0–150,000 parts, say 125,000 parts of heavy oil characterized by an API gravity of −5 to −15, say −8.3; and further characterized by the fact that 95 wt. % boils at least as high as 1025° F.

The combined liquid stream (251,876–401,876 parts, say 376,876 parts) is heated to 700° F.–850° F., say 800° F. and passed to a hydrotreating operation.

Also admitted to the hydrotreating operation is a hydrogen-containing stream formed by mixing 3,000–10,000 parts, say 7,000 parts of charge hydrogen (greater than 98.5 w % purity) and 12,000–40,000 parts, say 28,000 parts of a recycle stream containing 11,500–39,000, say 27,000 parts hydrogen, and 500–1,000, say 1,000 parts lower ($C_1$–$C_4$) hydrocarbons, principally methane. This gas stream is heated to 700° F.–850° F., say 800° F. in a heater and passed to the hydrotreating operation.

Hydrotreating is effected in liquid phase at 2,000–3,500 psig, say 3,000 psig in the presence of hydrogen and in the presence of catalyst. Typical hydrotreating catalyst may be cobalt-nickel-on-alumina or cobalt-molybdenum-on-alumina 1/32″ extrudate.

Gas in amount of 180,000–200,000 parts, say 180,000 parts at 120° F. (after cooling) is separated from hydrotreated effluent containing 50–80 w %, say 72 w % hydrogen; 15 w %–20 w %, say 16 w % lower ($C_1$–$C_4$) hydrocarbons, principally methane; 0.1–0.5 w %, say 0.2 w % ammonia, and 0.2–0.9 w %, say 0.7 w % hydrogen sulfide at 1,500–2,000 psig, say 1,500 psig. This gas is passed as high pressure purge gas to a collection manifold for ultimate passage to synthesis gas generation as a moderator and supplemental charge.

The high pressure liquid from separation (200,000–390,000 parts, say 380,000 parts) at 350° F.–450° F., say 400° F. and 600–800 psig, say 750 psig is preferably combined with 3,000–7,000 parts, say 5,000 parts of a liquid recycle stream containing naphtha and 1 w %–3 w %, say 2.5 w % of soot, (principally carbon); and the combined stream is fractionated to permit recovery of naphtha overhead and of a heavy bottoms slurry stream containing a heavy hydrocarbon fraction and soot—the latter slurry being passed to synthesis gas generation. Preferably this is effected in two stages, viz a middle distillate distillation operation and a vacuum distillation operation. In the preferred embodiment, the hydrotreated hydrocarbon stream containing naphtha and soot is passed first to a middle distillate distillation operation.

Overhead from the middle distillate tower is passed to a gas stripper from which there is recovered stripper overhead gas (1,000–5,000 parts, say 2,500 parts) which contains the following (weight %):

| Component | % | Preferred % |
|---|---|---|
| Hydrogen | 40–60 | 50 |
| Ammonia | 2–4 | 3 |
| $C_1$–$C_4$ hydrocarbons | 25–55 | 40 |
| $H_2S$ + COS | 1–10 | 7 |
| Inert | 1–5 | 2 |

This gas is passed to a collection manifold for recycle to hydrogen charge or to ultimate passage to synthesis gas generation as moderator and as a supplemental source of carbon.

Bottoms from the gas stripping operation include 35,000–50,000 parts, say 43,000 parts of which 5,000 parts are withdrawn. In one embodiment, the remaining stream may be passed to a decanting operation. Supernatant liquor from the decanting operation (3,000–7,000 parts, say 5,000 parts), containing naphtha and soot (1 w %–3 w %, say 2.5 w %), is passed to charge to middle distillate distillation operation.

A side stream (12,000–30,000 parts, say 14,000 parts) of hydrotreated product is recovered from the middle distillate tower having the following characteristics:

| Property | Broad | Preferred |
|---|---|---|
| API Gravity | 50–60 | 55 |
| ibp °F. | 180–200 | 180 |
| 50% °F. | 200–300 | 250 |
| ep °F. | 300–380 | 360 |

Bottoms from the middle distillate tower (185,000–270,000 parts, say 300,000 parts) at 360° F.–380° F., say 360° F. and are characterized as follows:

| Property | Broad | Preferred |
|---|---|---|
| API Gravity | 35–40 | 37 |
| ibp °F. | 350–360 | 360 |
| 50% °F. | 400–410 | 400 |
| ep °F. | 950–975+ | 975+ |

These bottoms are passed at 360° F.–380° F., say 360° F. to a vacuum tower. There are recovered from the vacuum tower a light vacuum gas oil (37,000–62,760 parts, say 62,750 parts) having the following characteristics:

| Property | Broad | Preferred |
|---|---|---|
| API Gravity | 25–35 | 29 |
| ibp °F. | 360–535 | 380 |
| 50% °F. | 600–635 | 635 |
| ep °F. | 715–790 | 790 | and a heavy gas oil (25,000–35,000 parts, say 33,000 parts) having the following characteristics:

| Property | Broad | Preferred |
|---|---|---|
| API Gravity | 15–25 | 22 |
| ibp °F. | 600–635 | 600 |
| 50% °F. | 715–790 | 775 |
| ep °F. | 950–975 | 950 |

Bottoms (a slurry) from the vacuum tower (26,000–190,000 parts, say 26,000 parts) include 0–1 w %, say 0.5 w % of soot (principally carbon) and oil and are characterized as follows:

| Property | Broad | Preferred |
|---|---|---|
| API Gravity | −10 to −5 | −7 |
| ibp °F. | 975–1,025° F. | 975+ °F. |

A portion (0–150,000 parts, say 125,000 parts) of vacuum tower bottoms may be recycled to charge to hydrotreating and the remainder passed to synthesis gas generation.

Charge to synthesis gas generation may include:

(i) 26,000–41,000 parts, say 26,000 parts of vacuum tower bottoms (including in one embodiment 0–1 w %, say 0.35 w % of soot) admitted at 450°–650° F., say 500° F. and 300–1,200 psig, say 750 psig;

(ii) 73,000–75,000 parts, say 73,000 parts of oxygen of purity of 98–99.5 w %, say 99.5 w % admitted at 250° F.–350° F., say 300° F. and 800–1,500 psig, say 900 psig;

(iii) 180,000–200,000 parts, say 180,000 parts of vent and purge gases (as moderator and supplementary feed stock) including at least a portion of the gases derived from separation supra and gas stripping overhead, these total gases typically containing:

| Component | Parts | Preferred Parts |
|---|---|---|
| Hydrogen | 100,000–150,000 | 129,000 |
| Ammonia | 400–800 | 600 |
| $C_1$–$C_4$ hydrocarbons | 30,000–65,000 | 48,000 |
| $H_2S$ + COS | 200–1,000 | 1,000 |
| Inert | 700–3,500 | 1,400 |

(iv) 0–150,000 parts, say 0 parts of steam (as supplemental moderator) admitted at 900–1,500 psig, say 950 psig.

In one preferred embodiment, the vacuum tower bottoms may be free of soot; and there may also be admitted to synthesis gas generation:

(v) 0.5–1.2 parts; say 0.5 parts of aqueous bottoms from synthesis gas generation at 400° F.–500° F., say 500° F. and 900–1,000 psig, say 950 containing 1–2 w %, say 1.5 w % of soot.

The charge materials, typically hydrocarbon liquid, solids, free-oxygen-containing gas, and moderator are admitted to a partial oxidation synthesis gas generation, typified by that set forth in U.S. Pat. No. 2,818,326 to Texaco as assignee of Eastman et al. This generator includes an annulus-type burner (such as is typified by that set forth in U.S. Pat. No. 2,928,460 to Texaco as assignee of Eastman et al) in a vertical cylindrical steel pressure vessel lined with a thermal refractory material.

As the charge components are admitted to the reaction vessel-combustion chamber, incomplete combustion is effected to yield a product hot raw gas which principally contains hydrogen, carbon monoxide, steam, and carbon dioxide. Other materials which may typically be present may include hydrogen sulfide, carbonyl sulfide (COS), methane, ammonia, nitrogen, and inert gases typified by argon.

The principal gaseous components in the product may include the following (volume % on a dry basis) when substantially pure oxygen is fed to the combustion chamber:

TABLE

| Component | Broad | Typical |
| --- | --- | --- |
| Carbon Monoxide | 30–60 | 47 |
| Hydrogen | 5–40 | 36 |
| Carbon Dioxide | 5–35 | 15 |
| Hydrogen Sulfide + COS | 0–5 | 1 |
| Nitrogen | 0–5 | 1 |
| Methane | 0–2 | 0.2 |
| Inert Gases | 0–1.5 | 0.1 |

The autogenous temperature in the combustion chamber of the gas generation zone may be 2,000° F.–3,000° F., say 2,550° F. at 100–2,500 psig, preferably 500–1200 psig, say 900 psig. Residence time for gasification may be 1–10 seconds, preferably 1–7 seconds, say about 3–5 seconds.

In addition to molten slag, the product synthesis gas is found to contain a particulate ash phase containing about 0.1 w %–20 w % of the organic carbon in the feed and typically about 1 w %–4 w %, say 2 w %. This particulate phase may correspond to about 0.5–20 grams, say 5 gram per normal cubic meter of gas.

The hot raw product synthesis gas leaves typically through a centrally positioned outlet in the bottom of the reaction zone, the outlet being coaxial with the central longitudinal axis of the reaction zone-gas generator. The gas passes downwardly through a bottom outlet zone and then in one embodiment may be admitted to the upper portion of a radiant cooler. The temperature of the gas as it is admitted to the radiant cooler is 2,000° F.–3,000° F., say 2,550° F. The linear velocity of the gas decreases as it enters the radiant cooling operation which is preferably located directly below and is coaxial with the central vertical axis of the reaction zone of the gas generator.

The radiant cooling chamber includes a refractory lining and a means for removing radiant heat impinging on the refractory liner. This preferably includes a heat exchange surface made up of a series of connected tubes arrayed preferably parallel to the main axis of the chamber. Heat exchange fluid passes through these tubes.

As the synthesis gas passes through the radiant cooling chamber, it is cooled by radiation typically to 900° F.–1,500° F., say 1,100° F. Ash and carbon contained therein are projected by velocity and gravity heads in a downward direction toward a collection point.

Ash and carbon are passed into contact with a pool of aqueous liquor at the lower portion of the synthesis gas generator to form a water-soot stream containing 0.5–2 w % soot, say 1 w % soot. This may be drawn off from the lower portion of the synthesis gas generator and a portion thereof purged. In a preferred embodiment, this stream may be recycled to charge to synthesis gas generation.

Product synthesis gas (206,000–241,000 parts, say 200,000 parts) at 400° F.–600° F., say 500° F. and 600–800 psig, say 750 psig is passed to a soot scrubber wherein it is contacted with aqueous fluid, typically water at 350° F.–450° F. say 450° F. Bottoms from soot scrubbing includes water containing 0.5–2 w %, say 1 w % of soot (mainly carbon).

This stream of water plus soot (bottoms from soot scrubbing) is passed to the synthesis gas generator wherein it contacts the synthesis gas. The water leaving the synthesis gas generator at 400° F.–600° F., say 450° F., and 600–800 psig, say 750 psig contains 0.5–2 w %, say 1 w % of soot.

The water-soot stream drawn off from the synthesis gas generator may be recycled to charge to the synthesis gas generator; or in a preferred embodiment it may be contacted with 4,000–6,000 parts, say 5,000 parts of naphtha at 250° F.–350° F., say 300° F. During this contact, the naphtha extracts the soot to form 3,000–7,000 parts, say 5,000 parts of a light naphtha-soot phase and 25,000–100,000 parts, say 50,000 parts of a water phase. The mixture is passed to a decanter from which the upper naphtha-soot phase is withdrawn and passed to middle distillate tower; and the lower water phase is passed to a flash tower in which remaining naphtha is flashed off—the water then being recycled to the soot scrubber.

A portion of the water (containing ash) may be withdrawn and fresh water may be added as needed.

Synthesis gas exiting the soot scrubber at 375° F.–450° F., say 420° F. and 600–800 psig, say 720 psig is passed to shift conversion where, in the presence of shift conversion catalyst, the charge gas which has been preheated to 650°–750° F., say 700° F. at 600–800 psig, say 720 psig is converted. The principal reaction is that between water and carbon monoxide to produce hydrogen and carbon dioxide. Product gas may contain (volume %):

TABLE

| Component | Broad | Preferred (volume %) |
| --- | --- | --- |
| Carbon monoxide | 0.5–1 | 0.5 |
| Hydrogen | 50–70 | 69.5 |
| Carbon dioxide | 20–35 | 30 |

Preferably this gas at 275° F.–325° F., say 300° F. psig is passed through an acid gas removal operation wherein acid gases are removed to give a gas containing 97–99.5 v % say 98.5 v % hydrogen and 0.5–3 v %, say 1.5 v % methane plus inert gas which may be recycled to hydrotreating.

ADVANTAGES OF THE INVENTION

It is a feature of this invention that it may be characterized by many advantages including the following:

(i) the carbon in the off-gas streams from hydrotreating of the heavy oils is utilized in the synthesis gas generation wherein is produced hydrogen used in the hydrotreating;

(ii) the inert components (hydrogen, hydrogen sulfide, ammonia, etc.) in the off-gas streams serve as temperature moderators in the synthesis gas generation and thereby decrease (or in certain embodiments eliminate) the need for steam as moderator in synthesis gas generation;

(iii) Since the ammonia and hydrogen sulfide-containing gases generated during hydrotreating are passed to synthesis gas generation, the acid gas removal and waste-water treatment systems normally associated with hydrotreating may be eliminated;

(iv) A hydrogen recovery system (typically associated with hydrotreating) is not needed because the hydrogen-containing off-gases are purified by burning out the $C_1$-$C_4$ hydrocarbon in the gasifier, and the other impurities are removed in the clean-up section of the synthesis gas generation operation; and (v) The presence of additional ammonia in the by-products will increase the ammonia concentration of the downstream recovery operations (including the raw water stripper overhead) and will thus contribute to viability of economic recovery of ammonia.

(vi) the naphtha is recovered from the charge to soot extraction in a naphtha (gas stripper) tower—thus eliminating the need for a separate naphtha stripping operation as is done in prior art operations; and (vii) the carbon content of the synthesis gas by-products is converted to liquid products.

BRIEF DESCRIPTION OF THE DRAWING

Practice of the process of this invention will be apparent to those skilled in the art from the following description of the best mode presently known to me (wherein as elsewhere all parts are parts by weight unless otherwise stated) and from the drawing which is a schematic process flow sheet.

DESCRIPTION OF PREFERRED EMBODIMENTS

EXAMPLE I

Figure 1:
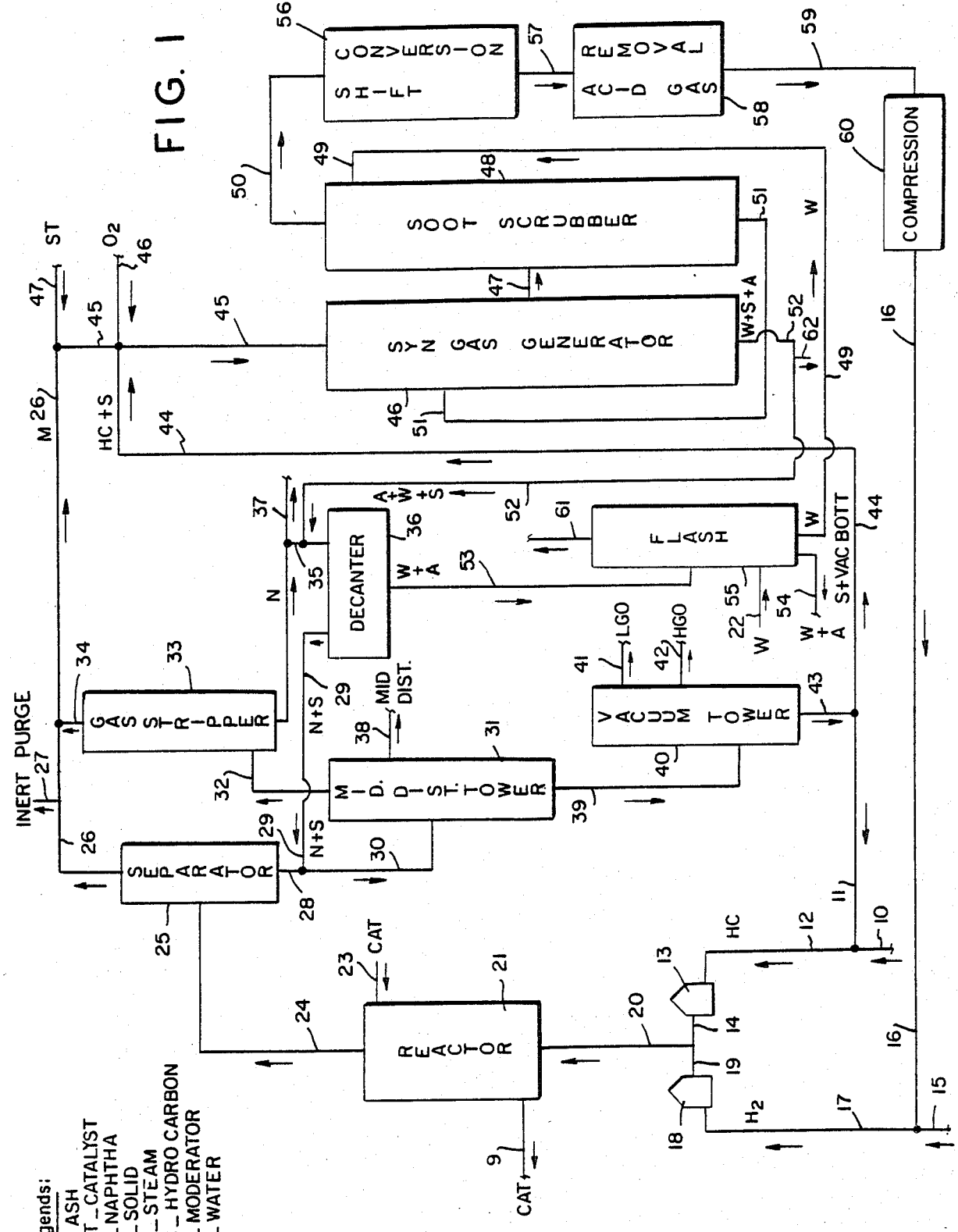
FIG. 1 represents the best mode of practicing the process of the invention.

In accordance with practice of the process of this invention as shown in FIG. 1, there is admitted through line 10 heavy hydrocarbon charge (251,876 parts) oil—a 2.8 API vacuum bottoms containing 83.96 w % carbon and 9.88 w % hydrogen, having a 95 w % bp above 975° F.

There is preferably also admitted through line 11 a recycle stream of soot-bottoms (125,000 parts) containing 0.35 w % of soot—essentially 95+ w % carbon of −8.3 API vacuum tower bottoms having a 95 w % bp of 1,025° F.

The combined stream in line 12 is heated in fired heater 13 to 800° F. from which it exits through line 14.

There is admitted through line 15, a hydrogen stream (7,000 parts) containing hydrogen of 98.5+ w % purity and this is combined with 28,000 parts of a recycle hydrogen stream in line 16 to form in line 17 a hydrogen stream which also contains $C_1$-$C_4$ hydrocarbons plus ammonia, hydrogen sulfide, and inert gases including argon. This hydrogen stream is heated in fired heater 18 to 800° F., withdrawn therefrom through line 19 and thence combined with the stream in line 14 and passed through line 20 to hydrotreating reactor 21.

Hydrotreating is carried out in reactor 21 at average inlet temperature of 800° F. and average pressure of 3,000 psig in liquid phase in the presence of, as catalyst, cobalt-molybdenum on 1/32" alumina extrudate. Reactor 21 is preferably an ebullient bed reactor wherein liquid hydrocarbon is contacted with catalyst admitted through line 23 and withdrawn through line 9. Reactor effluent in line 24 is collected in separator 25 at 400° F. and 750 psig. Uncondensed gas (180,000 parts) which is principally hydrogen (ca 72 w %), $C_1$-$C_4$ hydrocarbons, ammonia, hydrogen sulfide, and inert gases including argon, is withdrawn through line 26, and a portion may be removed from the system through line 27.

Liquid (380,000 parts) in separator 25 is withdrawn through line 28, combined with liquid from line 29 (5,000 parts containing naphtha plus solids) and passed through line 30 to middle distillate tower 31. Overhead, containing naphtha plus gases, principally hydrogen, $C_1$-$C_4$ hydrocarbons, ammonia, hydrogen sulfide, and inert gases including argon, is passed through line 32 to gas stripper 33 from which is recovered overhead gas through line 34 containing hydrogen, $C_1$-$C_4$ hydrocarbons, ammonia, hydrogen sulfide, and inert gases including argon.

Bottoms from gas stripper 33 containing 43,000 parts of naphtha are passed through line 35 to decanter 36. A portion of the bottoms may be withdrawn through line 37. Supernatant liquor from the decanter (5,000 parts) containing naphtha and 25. w % of solids, is passed through line 29 to line 28.

A side stream (24,000 parts) from middle distillate tower 31, drawn off through line 38 contains middle distillate. Bottoms from middle distillate tower 31, drawn off through line 39 contains 300,000 parts of 37° API hydrocarbon; and this stream at 650° F. is passed to vacuum tower 40.

From vacuum tower 40, there are withdrawn 62,750 parts of light vacuum gas oil 27° API through line 41 and 33,000 parts of heavy gas oil through line 42. Vacuum tower bottoms withdrawn through line 43 contain 0.3 w % soot. A portion of this is withdrawn through line 11 and the remainder is passed through line 44.

Charge to synthesis gas generation in this mode may include:

(i) 26,000 parts of hydrocarbon plus soot (0.35 w %) admitted through line 44. This soot is essentially pure carbon of small particle size; the −7 API hydrocarbon is characterized by its ibp of 975° F.:

(ii) 73,000 parts of oxygen (ca 99.5 w % purity) admitted through line 46;

(iii) 180,000 parts of vent and purge moderator gas and supplemental charge, admitted through line 26, containing the following:

| Component | Parts |
|---|---|
| Hydrogen | 129,000 |
| Ammonia | 600 |
| $C_1$-$C_4$ Hydrocarbons | 48,000 |
| $H_2S$ + COS | 1,000 |
| Inert | 1,400 |

These several components are passed through line 45 to synthesis gas generator 46. Combustion in generator 46 raises the temperature to 2,800° F. at 900 psig as there is produced synthesis gas containing the following gaseous components:

TABLE

| Component | Dry Basis vol. % |
|---|---|
| CO | 46.7 |
| $H_2$ | 36 |
| $CO_2$ | 15 |
| $H_2S$ + COS | 1 |
| $N_2$ | 1 |
| $CH_4$ | 0.2 |
| Inert gas | 0.1 |

Product synthesis gas is passed at 500° F. and 750 psig through line 47 into soot scrubber 48 from which it is recovered through line 50. Scrubbing fluid (water) is shown as schematically being admitted through line 49 at 450° F.

The bottoms from soot scrubber 48 (at 450° F. and 750 psig) contain 0.35 w % of soot of fine particle size. This water-soot stream is passed through line 51 to synthesis gas generator 46 wherein it picks up additional soot. Water plus soot leaves synthesis gas generator 46 through line 52. (A portion of the water and solids may be purged through line 62.) The stream in line 52 is contacted with naphtha from line 35. As these two streams mingle, the soot is extracted from the water phase. In decanter 36, the upper naphtha-soot layer is separated via line 29; and the lower water layer is passed through line 53 at 300° F. to flash tower 55. Hydrocarbons in the water layer may be flashed off and recovered through line 61 to be reused if desired. A portion of the water may be withdrawn with ash found at this point through line 54; and the remainder of the water may be passed through line 49 to soot scrubber 48. Fresh water may be added to the circuit as required through line 22.

Synthesis gas at 420° F. and 720 psig exiting the synthesis gas soot scrubber 48 through line 50 is passed to shift conversion operation 56. When necessary or desirable, there may be added additional steam (not shown) to the stream charged to shift converter 56. The latter contains cobalt molybdate-on-alumina as shift catalyst. As the charge gas, which has been preheated to 240° C., passes through the shift converter, the principal reaction includes that between water and carbon monoxide to produce carbon dioxide and hydrogen. Typical synthesis gas removed through line 57 includes the following:

TABLE

| Components | Parts (volume) |
| --- | --- |
| Carbon Monoxide | 0.5 |
| Hydrogen | 69.1 |
| Carbon Dioxide | 30 |
| Inert gas including $N_2$ | 0.1 |
| $H_2S$ plus COS | 0.1 |
| Methane | 0.2 |

Synthesis gas in line 57 in whole or part is passed through acid gas removal operation 58 wherein acid gas principally carbon dioxide, hydrogen sulfide and COS are removed as by absorption in triethanolamine.

Gas exiting through line 59 which contains hydrogen and carbon monoxide is compressed at 60 and recycled through line 16.

It is a feature of this specific embodiment of the invention that:

(i) it permits production of product hydrogen-containing synthesis gas in amount which is greater than is obtained by prior art synthesis gas generation processes using the same amount of charge oxygen; and (ii) it permits synthesis gas generation without use of steam moderator.

EXAMPLE II

Figure 2:
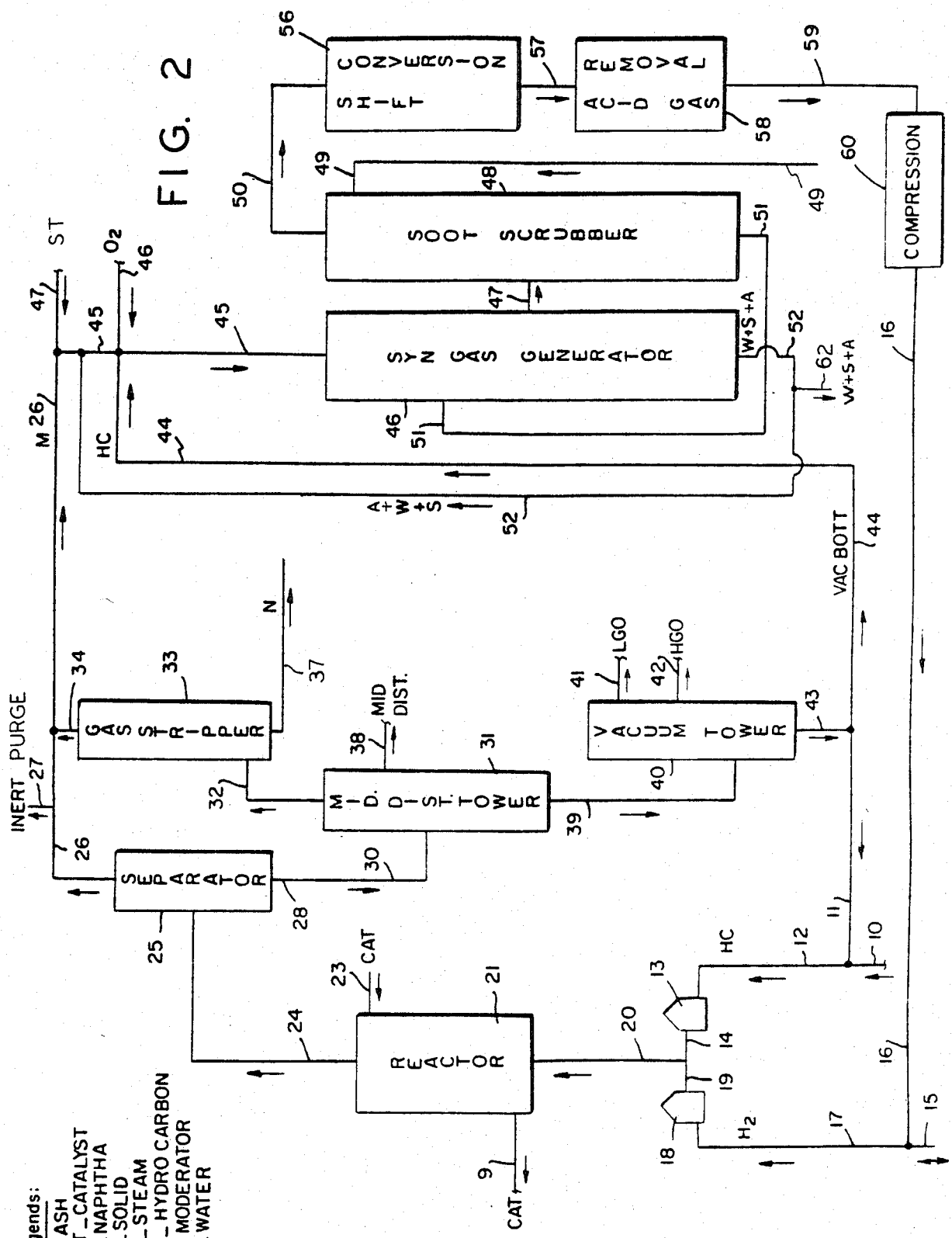
FIG. 2 represents a process flow of an alternative mode known to me of practicing the invention.

FIG. 2 sets forth an alternative embodiment of the process of this invention.

In this embodiment, the process flow is generally as in FIG. 1 except that the stream of water plus solids (principally carbon) leaving the bottom of synthesis gas generator 46 is (after drawoff of purge stream through line 62) passed to synthesis gas charge in line 45.

It is an advantage of this embodiment that it eliminates the decanter and flash tower from FIG. 1. Furthermore it provides the following additional advantages:

(i) elimination of naphtha feed to the middle distillate column permits reduction in tower size;

(ii) elimination of solids from charge to middle distillate tower and vacuum tower minimizes possibility of plugging therein;

The embodiment of FIG. 2 may be built at lower capital cost than that of FIG. 1—but it incurs higher operating costs due to higher oxygen consumption required to eliminate the soot in the synthesis gas generation unit.

Although this invention has been illustrated by reference to specific embodiments, it will be apparent to those skilled in the art that various changes and modifications may be made which clearly fall within the scope of this invention.

I claim:

1. The method which comprises
    hydrotreating a heavy hydrocarbon charge having a 95% boiling point above about 975° F. in the presence of hydrotreating catalyst at 700° F.–850° F. and 2,000–3,500 psig hydrogen partial pressure thereby forming a product stream containing (i) hydrotreated hydrocarbon characterized by a boiling point lower than that of said heavy hydrocarbon charge, (ii) hydrogen, (iii) ammonia and hydrogen sulfide, and (iv) lower hydrocarbons;
    separating from said product stream a separated gas stream containing hydrogen, ammonia, hydrogen sulfide and lower hydrocarbons;
    passing at least a portion of said separated gas stream as temperature moderator to a synthesis gas generation reaction zone wherein a hydrocarbon charge stream is gasified in the presence of a free-oxygen-containing gas and in the presence of said temperature moderator thereby forming increased quantities of product synthesis gas; and
    recovering said product synthesis gas.

2. The method claimed in claim 1 which comprises
    hydrotreating a heavy hydrocarbon charge having a 95% boiling point above about 975° F. in the presence of hydrotreating catalyst at 700° F.–850° F. and 2,000–3,500 psig hydrogen partial pressure thereby forming a product stream containing (i) hydrotreated hydrocarbon characterized by a boiling point lower than that of said heavy hydrocarbon charge, (ii) hydrogen, (iii) ammonia and hydrogen sulfide, and (iv) lower hydrocarbons;
    separating from said product stream a separated gas stream containing hydrogen, ammonia, hydrogen sulfide, and lower hydrocarbons and a separated liquid stream containing hydrotreated hydrocarbon characterized by a boiling point lower than that of said heavy hydrocarbon charge;
    fractionating said separated liquid stream in a middle distillate distillation operation thereby forming a middle distillate distillation operation overhead containing naphtha and lower hydrocarbons:
    stripping said middle distillate distillation operation overhead containing naphtha and lower hydrocarbons thereby forming a stripper overhead containing lower hydrocarbons;

passing at least a portion of at least one of said separated gas stream and said stripper overhead containing lower hydrocarbons as temperature moderator to a synthesis gas generation reaction zone wherein at 2,000° F.–3,000° F. and 100–2,500 psig a hydrocarbon charge stream is gasified in the presence of temperature moderator thereby forming increased quantities of product synthesis gas; and recovering said product synthesis gas.

3. The method claimed in claim 1 which comprises hydrotreating a heavy hydrocarbon charge having a 95% boiling point above about 975° F. in the presence of hydrotreating catalyst at 700° F.–850° F. and 2,000–3,500 psig hydrogen partial pressure thereby forming a product stream containing (i) hydrotreated hydrocarbon characterized by a boiling point lower than that of said heavy hydrocarbon charge, (ii) hydrogen, (iii) ammonia and hydrogen sulfide, and (iv) lower hydrocarbons;

separating from said product stream a separated gas stream containing hydrogen, ammonia, hydrogen sulfide, and lower hydrocarbons and a separated liquid stream containing hydrotreated hydrocarbon characterized by a boiling point lower than that of said heavy hydrocarbon charge;

fractionating said separated liquid stream in a middle distillate distillation operation thereby forming a middle distillate distillation operation overhead containing naphtha and lower hydrocarbons and a middle distillate distillation operation bottoms;

vacuum distilling said middle distillate distillation operation bottoms thereby forming a vacuum bottoms;

passing at least a portion of said vacuum bottoms to synthesis gas generation;

stripping said middle distillate distillation operation overhead containing naphtha and lower hydrocarbons thereby forming a stripper overhead containing lower hydrocarbons.

passing at least a portion of at least one of said separated gas stream and said stripper overhead containing lower hydrocarbons as temperature moderator to a synthesis gas generation reaction zone wherein at 2,000° F.–3,000° F. and 100–2,500 psig a hydrocarbon charge stream is gasified in the presence of temperature moderator thereby forming increased quantities of product synthesis gas; and recovering said product synthesis gas.

4. The method claimed in claim 3 wherein a portion of said vacuum bottoms is passed to said hydrotreating operation.

5. The method which comprises
(i) hydrotreating a heavy hydrocarbon charge having a 95% boiling point above about 975° F. in the presence of hydrotreating catalyst at 700° F.–850° F. and 2,000–3,500 psig hydrogen partial pressure thereby forming a product stream containing hydrotreated hydrocarbon characterized by a boiling point lower than that of said heavy hydrocarbon charge and a separated gas stream including, hydrogen, ammonia and hydrogen sulfide, and lower hydrocarbons;

(ii) mixing said hydrotreated hydrocarbon characterized by a boiling point lower than that of said heavy hydrocarbon charge and a recycle stream containing naphtha and soot thereby forming a hydrotreated hydrocarbon stream containing naphtha and soot;

(iii) fractionating said hydrotreated hydrocarbon stream containing naphtha and soot thereby forming a bottoms slurry stream containing a heavy hydrocarbon fraction and soot;

(iv) passing at least a portion of said bottoms slurry stream containing a heavy hydrocarbon fraction and soot as charge to a synthesis gas generation reaction zone wherein at 2,000° F.–3,000° F. and 100–2,500 psig, gasification is effected to yield product synthesis gas;

(v) passing at least a portion of said separated gas stream as temperature moderator to the synthesis gas generation reaction zone thereby forming increased quantities of product synthesis gas;

(vi) recovering said product synthesis gas.

6. The method which comprises
hydrotreating a heavy hydrocarbon charge having a 95% boiling point above about 975° F. in the presence of hydrotreating catalyst at 700° F.–850° F. and 2,000–3,500 psig hydrogen partial pressure thereby forming a product stream containing (i) hydrotreated hydrocarbon characterized by a 50% boiling point lower than that of said heavy hydrocarbon charge, (ii) hydrogen, (iii) ammonia and hydrogen sulfide, and (iv) lower hydrocarbons;

separating from said product stream a separated gas stream containing hydrogen, ammonia, hydrogen sulfide, and lower hydrocarbons and a separated liquid stream containing hydrotreated hydrocarbon characterized by a boiling point lower than that of said heavy hydrocarbon charge;

fractionating said separated liquid stream thereby forming a vacuum bottoms stream;

passing at least a portion of said vacuum bottoms stream as at least a portion of the hydrocarbon charge to a synthesis gas generation reation zone wherein at 2,000° F.–3,000° F. and 100–200 psig, the hydrocarbon charge stream is gasified in the presence of a free-oxygen containing gas and in the presence of said separated gas stream as temperature moderator thereby forming increased quantities of product synthesis gas;

collecting, in the lower portion of said synthesis gas generation reaction zone, a water slurry of soot formed during said synthesis gas generation reaction;

withdrawing from said lower portion of said synthesis gas generation reaction zone, said water slurry of soot;

passing at least a portion of said water slurry of soot to the synthesis gas generation reaction zone wherein at least a portion of said soot is converted to gaseous reaction products.

7. The method claimed in claim 6 including the steps of
scrubbing said product synthesis gas with water thereby forming a scrubbed product synthesis gas and a soot-water stream; and passing said soot-water stream to said synthesis gas generation reaction zone as at least a portion of the water charge to said water slurry.

8. The method which comprises
hydrotreating a heavy hydrocarbon charge having a 95% boiling point above about 975° F. in the presence of hydrotreating catalyst at 700° F.–850° F. and 2,000–3,500 psig hydrogen partial pressure thereby forming a product stream containing (i) hydrotreated hydrocarbon characterized by a lower boiling point than that of said heavy hydrocarbon charge, (ii) hydrogen, (iii) ammonia and hydrogen sulfide, and (iv) lower hydrocarbons;

flashing said product stream thereby separating (i) a gas stream containing hydrogen, ammonia, hydrogen sulfide and lower hydrocarbons and (ii) a flashed bottoms;

combining said flashed bottoms with a stream containing naphtha and soot thereby forming a combined stream;

distilling said combined stream thereby forming (i) overhead containing naphtha, (ii) middle distillate product, and (iii) bottoms containing heavy fractions plus soot;

vacuum distilling said bottoms containing heavy fractions plus soot thereby forming (i) distillate gas oils and (ii) vacuum tower bottoms containing soot;

recovering said vacuum tower bottoms containing soot;

passing at least a portion of said vacuum tower bottoms containing soot to synthesis gas generation, and passing at least a portion of said separated gas stream as temperature moderator to the synthesis gas generation reaction zone wherein the vacuum tower bottoms charge stream is gasified in the presence of a free-oxygen-containing gas and in the presence of the temperature moderator thereby forming increased quantities of product synthesis gas.

9. The method of claim 8 wherein at least a portion of said vacuum tower bottoms is recycled to said hydrotreating.

10. The method which comprises hydrotreating a heavy hydrocarbon charge having a 95% boiling point above about 975° F. in the presence of hydrotreating catalyst at 700° F.–850° F. and 2,000–3,500 psig hydrogen partial pressure thereby forming a product stream containing (i) hydrotreated hydrocarbon characterized by a lower boiling point than that of said heavy hydrocarbon charge, (ii) hydrogen, (iii) ammonia and hydrogen sulfide, and (iv) lower hydrocarbons;

flashing said product stream thereby separating (i) a gas stream containing hydrogen, ammonia, hydrogen sulfide and lower hydrocarbons and (ii) a flashed bottoms;

combining said flashed bottoms with a stream containing naphtha and soot thereby forming a combined stream;

distilling said combined stream thereby forming (i) overhead containing naphtha, (ii) middle distillate product, and (iii) bottoms containing heavy fractions plus soot;

vacuum distilling said bottoms containing heavy fractions plus soot thereby forming (i) distillate gas oils and (ii) vacuum tower bottoms containing soot;

recovering said vacuum tower bottoms containing soot;

passing at least a portion of said vacuum tower bottoms containing soot to synthesis gas generation;

passing at least a portion of said separated gas stream as temperature moderator to the synthesis gas generation reaction zone wherein the vacuum tower bottoms stream is gasified in the presence of a free-oxygen-containing gas and in the presence of the temperature moderator thereby forming increased quantities of product synthesis gas;

recovering from said synthesis gas generation zone a soot-water stream;

contacting said soot-water stream with naphtha thereby forming an extract stream containing naphtha and soot; and passing said extract stream containing naphtha and soot to said combining operation.

11. The method which comprises hydrotreating a heavy hydrocarbon charge having a 95% boiling point above about 675° F. in the presence of hydrotreating catalyst at 2,000° F.–3,000° F. and 100–2,500 psig hydrogen partial pressure thereby forming a product stream containing (i) hydrotreated hydrocarbon characterized by a lower boiling point than that of said heavy hydrocarbon charge, (ii) hydrogen, (iii) ammonia and hydrogen sulfide, and (iv) lower hydrocarbons;

flashing said product stream thereby separating (i) a gas stream containing hydrogen, ammonia, hydrogen sulfide and lower hydrocarbons and (ii) a flashed bottoms;

combining said flashed bottoms with a stream containing naphtha and soot thereby forming a combined stream;

distilling said combined stream thereby forming (i) overhead containing naphtha, (ii) middle distillate product, and (iii) bottoms containing heavy fractions plus soot;

stripping said overhead containing naphtha of gases contained therein thereby forming a stripped naphtha;

contacting said stripped naphtha with a soot-water stream in a contacting operation thereby forming an extract stream containing naphtha and soot and a raffinate stream containing water and hydrocarbon;

passing said extract stream containing naphtha and soot as said stream containing naphtha and soot in said combining operation;

vacuum distilling said bottoms containing heavy fractions plus soot thereby forming (i) distillate gas oils and (ii) vacuum tower bottoms containing soot;

recovering said vacuum tower bottoms containing soot;

passing at least a portion of said vacuum tower bottoms containing soot as charge to a synthesis gas generation operation;

and passing at least a portion of said separated gas stream as temperature moderator to the synthesis gas generation reaction zone wherein the vacuum tower bottoms charge stream is gasified in the presence of a free-oxygen-containing gas and in the presence of the temperature moderator thereby forming increased quantities of product synthesis gas.

12. The method claimed in claim 11 including the steps of flashing said raffinate stream containing water and hydrocarbon thereby forming a flashed bottoms stream which is substantially free of hydrocarbon; and passing said flashed bottoms stream which is substantially free of hydrocarbon to a soot scrubbing operation wherein soot is scrubbed, by contact with said bottoms stream, from said synthesis gas thereby forming a soot-containing effluent water from said soot scrubbing operation.

13. The method which comprises hydrotreating a heavy hydrocarbon charge having a 95% boiling point above about 675° F. in the presence of hydrotreating catalyst at 2,000° F.–3,000° F. and 100–2,500 psig hydrogen partial pressure thereby forming a product stream containing (i) hydrotreated hydrocarbon characterized by a lower boiling point than that of said heavy hydrocarbon charge, (ii) hydrogen, (iii) ammonia and hydrogen sulfide, and (iv) lower hydrocarbons;

flashing said product stream thereby separating (i) a gas stream containing hydrogen, ammonia, hydrogen sulfide and lower hydrocarbons and (ii) a flashed bottoms;

combining said flashed bottoms with a stream containing naphtha and soot thereby forming a combined stream;

distilling said combined stream thereby forming (i) overhead containing naphtha, (ii) middle distillate product, and (iii) bottoms containing heavy fractions plus soot;

stripping said overhead containing naphtha of gases contained therein thereby forming a stripped naphtha;

contacting said stripped naphtha with a soot-water stream in a contacting operation thereby forming an extract stream containing naphtha and soot and a raffinate stream containing water and hydrocarbon;

passing said extract stream containing naphtha and soot as said stream containing naphtha and soot in said combining operation;

vacuum distilling said bottoms containing heavy fractions plus soot thereby forming (i) distillate gas oil and (ii) vacuum tower bottoms containing soot;

recovering said vacuum tower bottoms containing soot;

passing at least a portion of said vacuum tower bottoms containing soot to a synthesis gas generation passing at least a portion of said separated gas stream as temperature moderator to the synthesis gas generation reaction zone wherein the vacuum tower bottoms charge stream is gasified in the presence of a free-oxygen-containing gas and in the presence of the temperature moderator thereby forming a product synthesis gas containing soot;

scrubbing with water said product synthesis gas containing soot thereby forming a scrubbed product synthesis gas and a soot-water stream; and passing said soot-water stream to said synthesis gas generation operation as at least a portion of the charge thereto.

* * * * *